March 16, 1954
B. S. MINOR
2,672,320
REPLACEABLE SHEAVE AND BEARING CONSTRUCTION FOR SHEAVE BLOCKS
Filed April 5, 1952
2 Sheets-Sheet 1
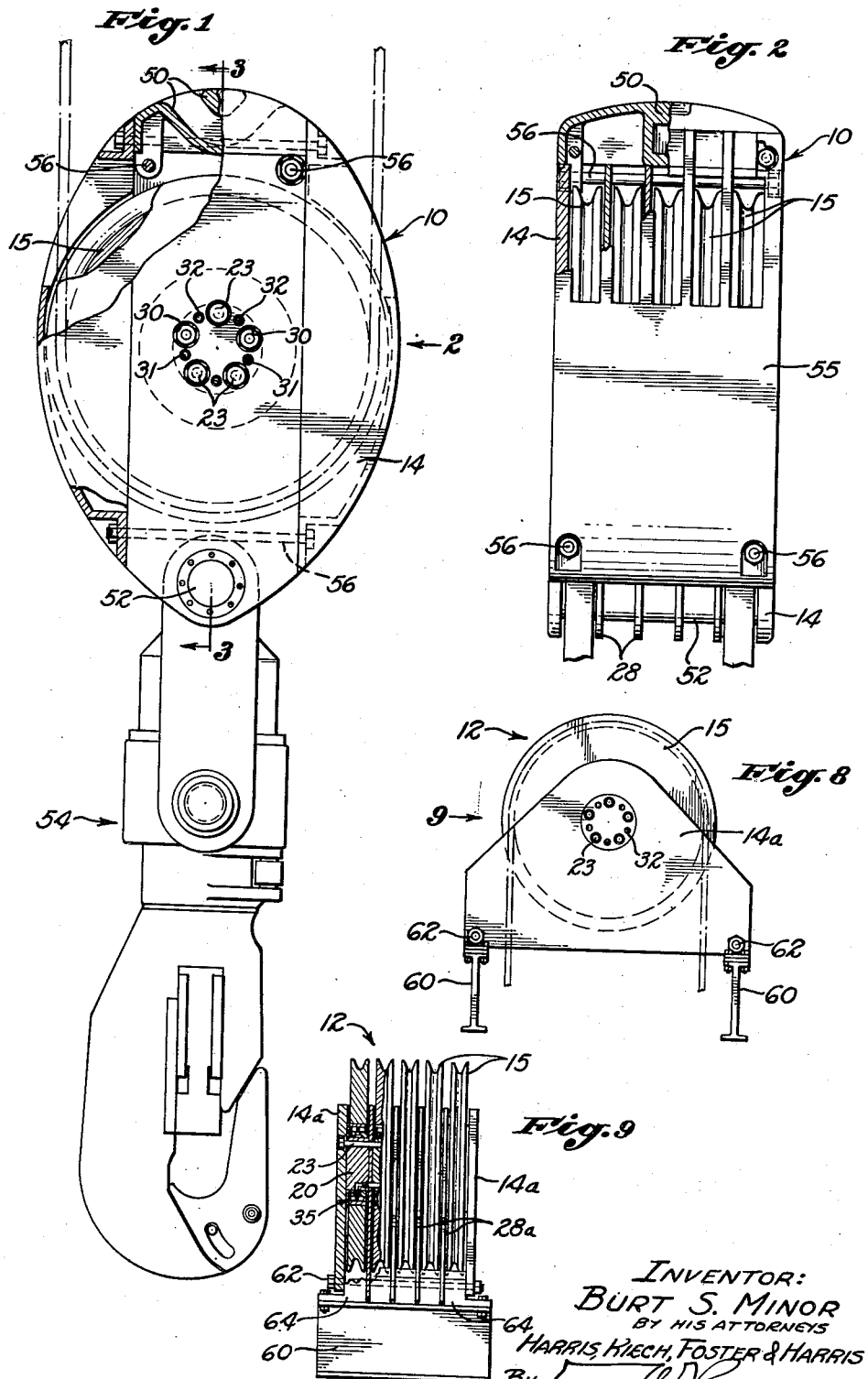
INVENTOR:
BURT S. MINOR
BY HIS ATTORNEYS
HARRIS, KIECH, FOSTER & HARRIS
By Ford W. Harris

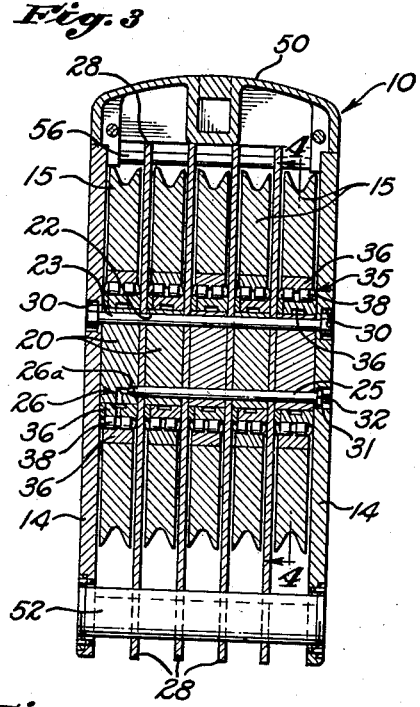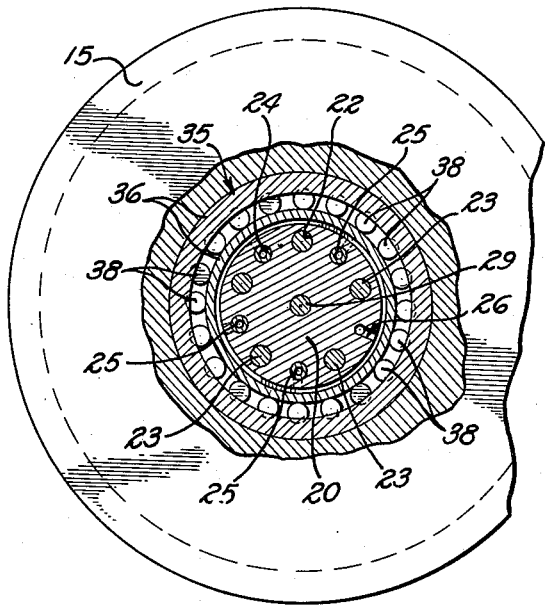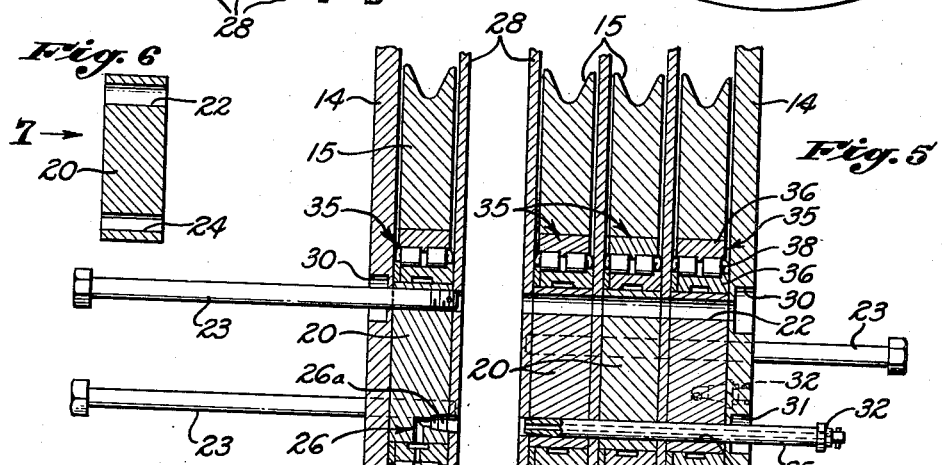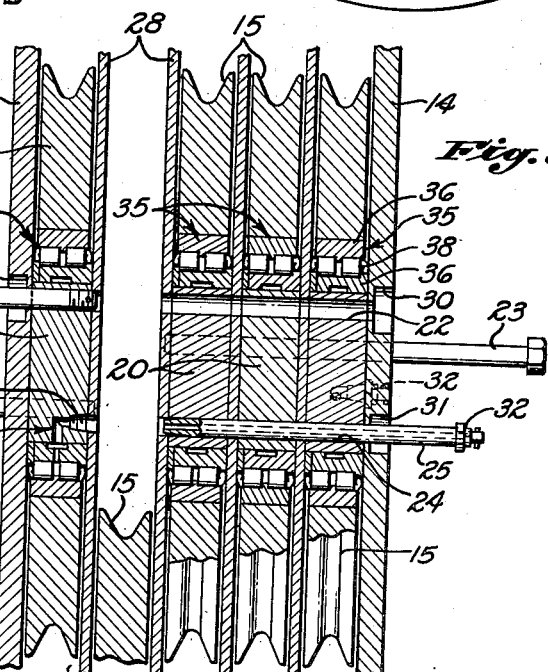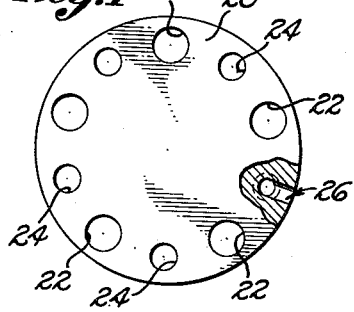

Patented Mar. 16, 1954

2,672,320

UNITED STATES PATENT OFFICE 2,672,320

REPLACEABLE SHEAVE AND BEARING CONSTRUCTION FOR SHEAVE BLOCKS

Burt S. Minor, Whittier, Calif., assignor to Regan Forge & Engineering Co., San Pedro, Calif., a corporation of California Application April 5, 1952, Serial No. 280,753

17 Claims. (Cl. 254—192)

This invention relates to constructions and arrangements of sheaves and bearings for crown and traveling blocks employed in such relationships as the drilling and servicing of oil wells for the handling of drilling and other heavy oil well equipment.

An important object of the invention is to provide sheave and bearing constructions and arrangements especially adapted for the ready repair of worn or broken sheaves or their bearings.

In many localities, especially in foreign fields, repair facilities frequently are not readily available, and as a consequence when a sheave or bearing fails in a traveling block or crown block used in oil-producing areas, a great deal of time and considerable cost is often involved because of the necessity of shutting down of operations while awaiting replacements parts of repair to be made at some rather remote place.

It therefore becomes a particular object of this invention to provide sheave block constructions and arrangements, and sheave and bearing units, of such nature that repairs may be made very easily on location by the relatively simple expedient of loosening parts of the sheave block assembly so as to remove only the offending unit and to replace the same with a new unit by a very simple operation.

It is another object of the invention to provide each sheave usable in a crown block or traveling block with its own center bearing member, both the sheave and the bearing having substantially the same thickness, such sheave and bearing being readily removable and readily replaceable with another of like construction.

An incidental object is to use for each sheave a central supporting block or pin providing a bearing and carrying the sheave, these parts constituting a replaceable unit which may be separately supplied as an individual package to be used when and where it may be desired.

Another object of the invention is to provide a construction of the indicated nature such that a plurality of like sheave and bearing units may be readily assembled to build up a sheave block combination of which any unit may be readily replaced by a similar unit without completely disassembling the sheave block combination and without the necessity for removing such crown or traveling block from the place of use. It is also an object to provide such a combination which avoids the necessity of even removing the cable lines from the sheave block during replacement of the worn or damaged unit.

A still further object of the invention is to provide sheave and bearing units by means of which a sheave block assembly may be readily built up in an appropriate supporting framework, the assembly being accomplished, positioned and retained in mounted position through such simple means as bolts extending through the assembly. A similar object is to provide in such a structure for the use of a plurality of bolts or the like which permits withdrawal of bolts only part way from opposite sides of the assembly so as to free a damaged sheave and bearing unit so that the latter may be quickly replaced.

Another object is to provide a construction of the indicated nature which is equipped with means for readily lubricating individually the bearings of the respective sheave and bearing units. An incidental object is to provide in such a structure for the use of lubricating tubes projecting into appropriate passages of the respective units whereby to apply grease or other lubricant to the individual bearing means.

A still further object of the invention is to eliminate the usual center pins upon which all sheaves of a crown or traveling block assembly are mounted and to replace the same with individual, central bearing blocks which may be bound together by bolts or similar means in an operative assembly. An incidental object is to provide individual sheave and bearing units in the nature of subassemblies which are individually easy to transport into remote areas because of their smaller sizes and lesser weights, these being quickly assembled when the place of use is reached.

Another important object is to provide a type of sheave and bearing construction for crown and traveling blocks which will permit the mentioned ready transportation, assembling and repair while at the same time reducing cost without loss in durability or life.

Other objects of the invention together with various features of construction of preferred forms thereof will become apparent to those skilled in the art upon reference to the following specification and the accompanying drawings.

In the drawings:

Fig. 1 is principally a side elevation of a traveling block equipped with a sheave and bearing arrangement of this invention, portions being broken away to reveal internal members;

Fig. 2 is a similar view in edge elevation, as indicated by the arrow 2 of Fig. 1, of the sheave assembly shown in the upper part of Fig. 1;

Fig. 3 is a vertical section taken approximately on the line 3—3 of Fig. 1;

Fig. 4 is in part a vertical section taken at right angles to the view of Fig. 3, as indicated by the line 4—4 of Fig. 3, this view being on an enlarged scale and showing only one sheave and its mounting;

Fig. 5 is a partially exploded section corresponding generally to that of Fig. 3 and on the scale of Fig. 4 to indicate how a damaged sheave and bearing unit may be released and dropped out for the purpose of replacement by a new unit;

Fig. 6 is a cross section through one of the central bearing blocks or supports which carries a corresponding sheave and intervening bearing means;

Fig. 7 is a view of one face of a bearing block, as indicated by the arrow 7 of Fig. 6, to show the relation, in the case of a five-sheave assembly, of the holes for the bolts which assemble the structure and the lubricant-supplying passages, one of which passages is to lubricate the respective bearing means and the others of which provide for through passage of lubricating means to other bearing blocks;

Fig. 8 is a side elevation illustrating the application of the invention to a crown block; and Fig. 9 is an edge view indicated by the arrow 9 of Fig. 8, portions being broken away to reveal internal construction.

In Figs. 1, 2 and 3 the present invention is illustrated as applied to a traveling block generally indicated at 10, and in Figs. 8 and 9 the invention is illustrated as applied to a crown block generally indicated at 12. The traveling block 10 is shown as having side supporting plates 14, and in the crown block structure side supporting plates 14a are shown. Both forms of sheave blocks employ a plurality of more or less conventional grooved wheels or pulleys commonly known as sheaves and herein designated as sheaves 15. Each sheave 15 is assembled with a center support or bearing block 20 which, in the form shown, is cylindrical and carries any appropriate bearing means for the respective sheave 15, as presently to be described.

As best seen in Figs. 3 to 7 the center support for block 20 of each sheave unit is only slightly thicker than its sheave 15, such slight increase in thickness providing for the clamping in position of the series of supports or bearing blocks 20 as illustrated, without binding the sheaves 15 against rotation thereon. Each of the blocks 20 is provided with an annular series of uniformly positioned and equidistantly spaced bore holes or passages 22 (Figs. 6 and 7) for the reception of mounting bolts 23 in such passages when aligned in an assembled series of blocks 20. Each block 20 is also provided with an annular series of uniformly spaced lubricating passages 24 adapted to receive selectively a series of successively shorter grease tubes 25. The number of passages 24 in each block 20 may be the same, in order to provide for uniformity of manufacture. In any event, there may be one passage fewer than the number of sheaves 15 because each bearing block 20 is provided with one L-shaped passage 26 for the supplying of lubricant to its bearing means. Thus, as seen in the lower portion of Figs. 3 and 5, the longest lubricant tube 25 extends through the first four sheaves 15 and is threaded into a threaded seat 26a (Fig. 5) at the entrance to the respective L-shaped passage 26 of the last sheave 15. Obviously, in this instance the lubricating passages 24 are idle (and could be omitted if it were not for manufacturing uniformity), whereas in the case of the first sheave 15 all of the four lubricating passages 24 are occupied by grease tubes 25.

In practice it is important to employ separator plates 28 between the various sheaves 15 to effect proper control of the various cables being employed, and these separator plates are necessarily perforated to correspond with the required passages 22, 24 and 26. If desired, a central bolt 29 shown only in Fig. 4 could be extended through the entire assembled structure. As best seen in Fig. 5 both of the mounting end plates 14 are preferably countersunk as indicated at 30 to receive the heads and nuts of the bolts 23. Similarly, that end plate 14 through which the lubricant tubes 25 are introduced is countersunk as indicated at 31 to receive as much as desired of a nut and grease fitting indicated at 32 of each tube 25.

As previously indicated, the grease tubes 25, the shortest and longest of which are shown in Fig. 5, supply the bearing means of the successive sheave units with lubricant, the proper sequence being accomplished by rotating the block 20 to the proper position to accommodate each length of grease tube 25. These bearing means, which are generally indicated at 35, may include inner and outer races 36 and intermediate roller bearings 38. By such means each bearing 35 is insured of individual lubrication by reason of its tube 25.

When the nuts of the bolts 23 are drawn up tight as indicated in Fig. 3 and also in Fig. 9, the end mounting plates, the separator plates 28, and the center supports or bearing blocks 20 are tightly bound together in operative relation while leaving the slightly thinner sheaves 15 free to rotate. Lubricant is introduced through the respective, successive longer tubes 25 and the fittings 32 to the respective L-shaped lubricant passages 26 and the respective bearings 35, for individual lubrication as above indicated.

When a sheave or bearing fails, the procedure indicated in Fig. 5 is followed. Thus, the nuts at both sides of the assembly are removed from the bolts 23, and, the offending sheave and bearing have been determined, the respective sets of bolts 23 are withdrawn from the opposite sides far enough to release the offending sheave and bearing while retaining on their inner end portions those sheaves and bearings which are in usable condition. Also, those lubricant tubes 25 which extend to or through the offending bearing are loosened and at least partially withdrawn. Having particular reference to the arrangement of Fig. 5, the bolts to the left are withdrawn only far enough to release the sheaves and bearing second from the left, while retaining that sheave and bearing assembly at the extreme left. Similarly, the other set of bolts 23 is withdrawn to the right far enough to release the sheave and bearing second from the left while retaining the three sheaves and bearings at the right, the tubes 25 having been correspondingly withdrawn. This condition permits the offending sheave and bearing to drop out. Thereupon a new sheave and bearing is inserted and adjusted to proper position to receive the bolts 23 which are then returned to original position and tightened in place. The corresponding lubricant tubes 25 are also restored. Thus, by a relatively simple operation the entire sheave block is repaired without any appreciable loss of time.

The described operation is substantially the same regardless of whether the sheave and bearing assembly is carried in a traveling block as in Figs. 1, 2 and 3 or in a crown block as in Figs. 8 and 9. In the case of a traveling block, the side supporting plates 14 cooperate with an upper bail section 50 to form a housing, a transverse supporting shaft 52 being provided in the lower ends of the various plates 14 and 28 to support any convenional hook unit 54. To effect a desirably complete housing the edge portions of this block assembly are provided with closure plates such as indicated at 55, bolts 56 being used to bind these various parts together.

As indicated in Figs. 8 and 9 the side plates 14a of the crown block are conventionally supported upon rails 60 and secured thereto by means of appropriate bolts 62 and mounting blocks 64.

While the lubricant tubes 25 are indicated as being introduced from and mounted in only one side plate 14, so that the longest of the tubes extends entirely across the assembly, it might be desirable in some instances to introduce some of the tubes 25 from one side and others from the other side in which case the corresponding cylindrical bearing blocks 20 would be turned 180° from the position shown in order to direct the angular discharge passages 26 in the opposite direction whereby to mount the inner ends of the corresponding tubes 25. In such an instance the longest tube would be that which leads to the middle sheave where an odd number of sheaves is employed, or to the two sheaves nearest the middle where an even number of sheaves is employed. Commonly, the number of bolts 23 used will be at least as great as the number of sheaves used, or at least two bolts 23 will extend from each side of the assembly in order to maintain the relative position of those sheave units which are being retained. Desirably a set of at least three bolts would extend from each side, in which case, where five sheaves are used as illustrated, the mentioned central bolt 29 could be used as the third bolt of the respective set.

From the foregoing it will be apparent that only a very simple operation is required to replace a given sheave and bearing unit, this consisting merely in partially withdrawing the retaining bolts 23 and 29 and lubricant tubes 25 for removal of the unit, positioning a new unit, and returning the bolts and tubes to original position.

With the traveling block 10, the only other operation is removal of the closure plates 55 and their bolts 56. It is not necessary to unthread any portion of the usual line or cable from either a traveling block or a crown block. Thus, immediately upon slipping in the new unit and restoring the mounting bolts 23, either block is again ready for use.

I claim as my invention:

1. In a sheave and bearing combination: a plurality of sheaves; and center bearing means for said sheaves including a plurality of bearing blocks for the respective sheaves, each block having substantially the same thickness as its sheave and having passages for reception of mounting means for said blocks.

2. A combination as in claim 1 including supports disposed at the sides of the sheaves and bearing blocks, said supports having apertures corresponding with said passages and receiving bolts disposed in said passages.

3. For a sheave and bearing assembly: center bearing means for a plurality of sheaves, said bearing means including a plurality of alignable cylindrical bearing blocks for said sheaves, each bearing block having a plurality of bolt-receiving passages, the passages of adjacent blocks being alignable for reception of bolts to mount the assembly.

4. An assembly as in claim 3 wherein said blocks are provided with lubricating passages and lubricant tubes are disposed in said lubricating passages.

5. An assembly as in claim 4 wherein said tubes extend from a side of the assembly, the tubes being successively longer and respectively communicating with lubricant discharge outlets provided in the respective blocks.

6. In combination: a plurality of sheaves disposed alongside one another; side supports for said sheaves; a plurality of bearing cylinders upon which said sheaves are respectively rotatably mounted, said bearing cylinders being provided with a plurality of bolt passages and a plurality of lubricating passages, the respective passages of the bearing cylinders being aligned; and supporting bolts extending through said bolt passages and mounting said bearing cylinders and sheaves in said supporting plates.

7. A combination as in claim 6 including lubricant tubes mounted in said lubricating passages and respectively supplying lubricant to said cylinders and their sheaves.

8. A combination as in claim 7 including spacing plates between adjacent sheaves and bearing cylinders, said spacing plates being also provided with passages receiving said supporting bolts and lubricant tubes.

9. A combination as in claim 7 including bearing means between said sheaves and their bearing cylinders, said lubricant tubes and passages feeding respectively to said bearing means.

10. A combination as in claim 6 including spacing plates between adjacent sheaves and bearing cylinders, said spacing plates being also provided with passages receiving said supporting bolts.

11. In combination in a sheave and bearing assembly: a center bearing support having a plurality of passages therethrough parallel to its axis, said passages being formed to receive a corresponding plurality of mounting means to bind the support in a framework; and a sheave rotatably borne upon said support, said sheave and support being of substantially equal thickness for installation and removal as a separate unit, in a space of corresponding width.

12. A combination as in claim 11 wherein said center support is provided with a plurality of lubricating passages extending parallel to said axis.

13. A combination including a plurality of the sheave and bearing assemblies of claim 11, the mounting-means passages of the assembled center bearing supports being uniformly spaced for alignment to receive said mounting means, each center support being provided with a plurality of lubricating passages extending parallel to said axis, and said plurality of lubricating passages being uniformly spaced for alignment of such passages of the assembled supports to receive lubricant-conducting means.

14. A combination including a plurality of the assemblies of claim 11, said passages being uniformly spaced for alignment of the passages of the respective supports and reception of connecting bolts in said passages.

15. A sheave block combination including: a plurality of sheaves; a plurality of apertured bearing means upon which said sheaves are rotatably mounted respectively, each bearing means having a plurality of apertures and being of approximately the same thickness as its sheave, and the apertures of the respective bearing means being aligned; spaced supporting means receiving said sheaves and their bearing means between them; and plural bolt means extending through said apertures and supporting means and binding said bearing means in sheave-supporting position in said supporting means, some of said plural bolt means being withdrawable from one side of said combination and others thereof being withdrawable from the opposite side for release of a selected sheave and its bearing means.

16. A combination as in claim 15 wherein each bearing means is provided with a plurality of tube passages therethrough and an angular lubricant discharge passage, and wherein lubricant tubes of differing lengths extend selectively from at least one of said spaced supporting means through successive bearing means and have their inner ends communicating with the discharge passages of the respective bearing means.

17. A sheave block combination including: a plurality of sheaves of a given number; a plurality of apertured bearing means upon which said sheaves are respectively rotatably mounted, each bearing means having a plurality of equidistantly spaced support apertures corresponding in number to said given number of sheaves, and each bearing means having a plurality of equidistantly spaced lubricating passages corresponding in number with the sheaves in the combination, one of which passages in each bearing means being angularly shaped and directed outward to the periphery of such bearing means, the other lubricating passages in each bearing means extending transversely therethrough; spaced supporting means receiving said sheaves and their bearing means between them; supporting bolt means extending through said support apertures and said spaced supporting means; and lubricating conduit means of differing lengths extending through certain of said spaced supporting means and through said lubricating passages of certain of said bearing means and connecting at their inner ends with the angular passages of the respective bearing means, whereby said support apertures and said lubricating passages can be rotated in the assembly of the sheave block to align and provide for introduction into said lubricating passages of said lubricating conduit means of differing lengths.

BURT S. MINOR.

References Cited in the file of this patent

UNITED STATES PATENTS

| Number | Name | Date |
|---|---|---|
| 1,910,173 | Laing et al. | May 23, 1933 |
| 2,274,099 | Smith et al. | Feb. 24, 1942 |
| 2,282,633 | Young | May 12, 1942 |
| 2,382,049 | Frankhouser | Aug. 14, 1945 |
| 2,423,142 | Frankhouser | July 1, 1947 |
| 2,511,729 | Maier | June 13, 1950 |